United States Patent [19]

Reed

[11] Patent Number: 4,853,744
[45] Date of Patent: Aug. 1, 1989

[54] DIFFUSER FOR COLOR ANALYZER

[76] Inventor: Roger G. Reed, 6704 Hoover Rd., Indianapolis, Ind. 46260

[21] Appl. No.: 213,130

[22] Filed: Jun. 29, 1988

[51] Int. Cl.$^4$ ............................................. G03B 27/80
[52] U.S. Cl. ..................................................... 355/38
[58] Field of Search ...................... 355/32, 35, 38, 68, 355/41, 45, 71, 77; 250/237 R, 237 G

[56] References Cited

U.S. PATENT DOCUMENTS

| | | | |
|---|---|---|---|
| 3,215,055 | 11/1965 | Campbell et al. | 355/106 |
| 3,744,901 | 7/1973 | Harter | 355/38 |
| 4,003,653 | 1/1977 | Kelly | 355/77 |
| 4,821,073 | 4/1989 | Backus et al. | 355/38 X |

*Primary Examiner*—L. T. Hix
*Assistant Examiner*—Khanh Dang

[57] ABSTRACT

There is disclosed herein a diffusing device for use with photographic darkroom color analyzers when no gray card appears in any of the frames on the strip of film which have the same lighting conditions as the frame to be analyzed. The diffuser is used for determining correct color balance of an area of film which is mottled, such as human skin, by eliminating moles, freckles, dark shadows etc. from the image being analyzed with light blockers. The diffuser is made of flat translucent material in a plurality of shapes. Supports hold it above the analyzer sensor. The invention includes a variety of light blockers of various shapes made of opaque material such as sheet metal, all light blockers having the same area. A diffuser of an appropriate shape is placed within the projected image to be analyzed and moved around until it is within an area of flesh selected to be analyzed. If there is a small area of the selected area that should not be included in the analysis, such as a mole, freckle or dark shadow, then one or more light blockers of appropriate shapes are selected to be placed on top of the diffuser to block the undesired small area of light from the analyzer sensor. Then the film is analyzed in the usual manner using an exposure factor appropriate for the combination of the diffuser and light blockers.

3 Claims, 1 Drawing Sheet

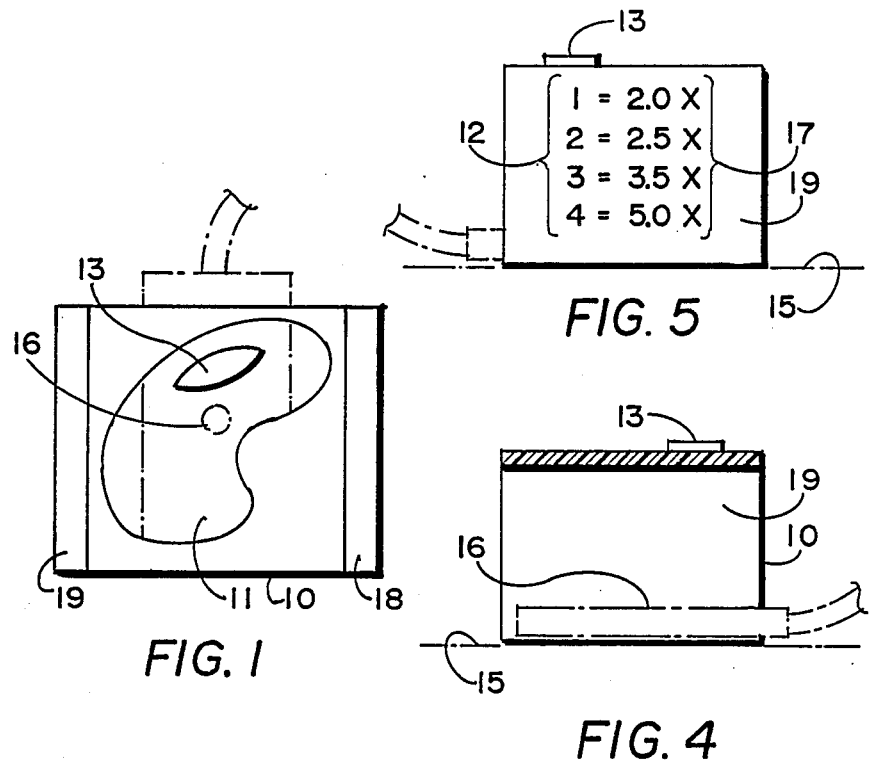
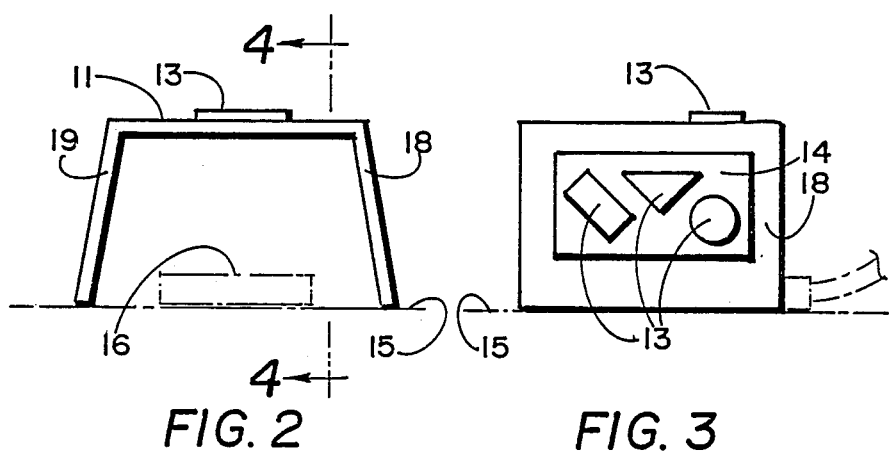

4,853,744

DIFFUSER FOR COLOR ANALYZER

TECHNICAL FIELD

This invention relates to light diffusers and more specifically to diffusers used with color analyzers in the photographic dark-room.

BACKGROUND ART

Prior to this invention, diffusers were used just below an enlarger lens to diffuse an entire frame to be printed. The analyzer, in such a situation, would read the average color and average density of the frame. Frames which are appropriate for this type of analysis are gray cards and certain outdoor scenes. This method will not give useful results, however, when attempting to analyze flesh tones in a frame which includes other colors. One method used to analyze flesh tone is to place the sensor of the analyzer in the flesh area of the projected image without using a diffuser to average the frame, but the problem with this method is the difficulty of locating a tiny area, the size of the analyzer sensor, in the area of flesh which exactly represents the flesh color and density that the analyzer is programmed for. In other words, the sensor could be reading a mole, freckle, dark shadow or other feature which is not visually obvious to the technician and does not represent the color and density of the flesh tone which the analyzer is programmed for.

Therefore, there is still a need for an invention which will allow the averaging of an area of flesh in a frame with a means of excluding a plurality of other small areas within said area of flesh which would incorrectly influence the analysis of said flesh area because of a difference in color or density between said flesh area and said other small areas.

DISCLOSURE OF THE INVENTION

There is provided by this invention an averaging diffuser for use with photographic color analyzers in determining correct color balance of an area of film which is mottled, such as human skin, by eliminating moles, freckles, dark shadows, etc. which are small but grossly different from the average color and density which is intended to match the analyzer program. The diffuser is made of a flat translucent material and can be any shape. Supports hold it above the enlarger easel providing space beneath for an analyzer sensor. A variety of small light blockers made of opaque, light blocking material such as sheet metal, are also provided with all the shapes having equal areas. The diffuser has exposure factors printed thereon representing various quantities of light blockers which can be used on the surface of the diffuser.

An area of flesh is selected to be analyzed and diffuser of the appropriate shape is selected and placed in the area of the image to be analyzed, then light blockers are placed upon the diffuser to block out all undesirable features such as moles, freckles, eyes etc. The analyzer is programmed to reproduce the flesh tone wanted and the analyzer sensor is placed under the diffuser and the image is analyzed using the exposure factor appropriate for the quantity of light blockers used.

This invention eliminates the problem of printing incorrectly analyzed photographs of people caused by the difficulty of finding a tiny area, the size of the sensor, that is exactly the average color and density required to match the program of the analyzer.

It is the object of this invention to make available at a modest cost to darkroom technicians an easy to use, inexpensive device for color balancing photographs of people and at the same time saving time and materials. This invention eliminates the necessity of having a gray card showing for each different light condition in every roll of film. These and other objects of the invention will become apparent from the following description and appended claims.

BRIEF DESCRIPTION OF THE DRAWINGS

FIG. 1 is a top view of the invention.
FIG. 2 is a front elevation of the invention.
FIG. 3 is a right side view of the invention showing an embodiment whereon the light blockers are held in storage by a strip of magnetic material.
FIG. 4 is a section view taken through 4—4.
FIG. 5 is a left side view of the invention showing an embodiment whereon quantities of light blockers and their corresponding exposure factors are printed.

BEST MODE FOR CARRYING OUT THE INVENTION

Definitions

Analyzer program
The settings of the controls of an analyzer to cause a particular color and saturation in the analyzed portion of a photograph.
Averaging
Mixing or blending the colors of an image projected through a diffuser to the extent that the resultant mixture is a single smooth, homogeneous color and saturation.
Color Balance
Adjusting the Cyan, Yellow and Magenta filters in an enlarger to reproduce, as nearly as possible, the true colors of a subject. Also: adjusting the filters as per analyzer meter readings.
Color Cast
A color added to the entire area of a photograph thus deviating from the true colors of a subject.
Density
Relative darkness of film emulsion.
Frame
Each individual exposed area of film.
Gray Card
A standard 18% reflectance neutral gray photographic test card representing the average density of an average scene.
Light Blockers
Small flat opaque shapes used to block light from a portion of a diffuser.
Print (verb)
The entire process that photographic paper goes through to arrive at the finished photograph, including but not limited to exposing, developing, fixing, washing and drying.
Saturation
Relative darkness of colors in a photograph.
Strip
A strip or roll of film with a plurality of frames on it.
Referring now to the drawings, in FIG. 1 there is shown a diffusing device 10 generally made of flat translucent material with all but the diffusing area 11 being opaque. One embodiment is shown in FIGS. 1, 2, & 3 in which both ends of a rectangular shape are bent to form supports to hold the diffusing area 11 of the invention a fixed distance from the enlarger easel 15 leaving space for an analyzer sensor 16 to be oriented beneath the diffusing area 11. A segment of magnetic tape 14 is affixed to a first support 18 which stores, by magnetic attraction. light blockers 13 which are made of an opaque, magnetic material, such as sheet metal. A plurality of exposure factor numbers 17 and corresponding light blocker quantities 12 are printed on a second support 19 and the first exposure factor includes the effect of one light blocker 13 placed anywhere in the diffusing area 11. The second exposure factor includes the effect of two light blockers and so on.

For example

It is desired to print a portrait from a frame and there is no gray card showing in the frame nor in any other frame with the same lighting conditions on the strip of film. Programming the analyzer for a gray card is of no use in the absence of a gray card frame. The analyzer could be programmed for a desired flesh tone, for example, pale caucasian, tan caucasian, oriental, etc., and the skin could be analyzed directly without the air of a diffuser, but the presence of moles, freckles, blemishes, dark shadows, etc. make it difficult to find a spot, on which to place the sensor, which is representative of the analyzer program thus preventing this method from giving good predictable results. Good color saturation in a projected negative image is very difficult to judge visually. Another factor which increases the difficulty is the large grain of the film when enlarging the frame. At high magnification, the sensor 16 may be reading too few grains of color to yield a true average and could cause an undesirable color cast in the final photograph. Therefore, this invention is needed to improve the results of such an analysis. First, select an analyzer program which will closely match the flesh color of the person that was photographed. Second, select an area of flesh from the frame which, if it was the actual person's flesh, would closely match the analyzer program when averaging the area of flesh. Third, select a diffuser 11 with a shape that approximately fits the shape of the area of flesh selected. Place the diffuser 11 within the projected image to be printed and move it around until it is within said selected area of flesh that is to be analyzed. Further suppose that an eye is in said selected area of flesh to be analyzed. Since the eye is not flesh colored it will adversely affect the analysis, therefore, select a light blocker 13 of an appropriate shape to approximately fit the image of the eye and place it on top of the diffuser to block the undesired image of the eye from the analyzer sensor 16. The remaining image can be analyzed with good results by using the exposure factor corresponding to one light blocker 13. Now the enlarger color filters can be set as per the analyzer meter indications, and the portrait printed. When the area to be analyzed has more than one object to be blocked from the analyzer sensor 16, such as red lipstick and a lock of black hair, use more than one light blocker 13 and the exposure factor 17 corresponding to the number 12 of light blockers used From the foregoing, it is seen that a means for color balancing photos of people without the use of a gray card is made possible in an inexpensive, and quick manner saving time, photographic paper and chemicals. It will also be appreciated that colors other than flesh can be analyzed in the same manner and that modifications can be made to the embodiment shown herein without departing from the spirit and scope of this invention. Such modifications include, but are not limited to, adding, modifying or omitting shapes of light blockers and varying the shape of the diffuser, and providing a different means of support.

I claim:

1. A light diffusing device which allows selected portions of a projected image to be excluded from a color analysis of photographic film comprising a diffuser with means for positioning said diffuser parallel to a surface upon which an analyzer sensor rests during said analysis at a distance from said diffuser sufficient to cause thorough mixing of all colors of an image projected from said film upon said diffuser and a plurality of light blockers which block selected portions of said image from said diffuser.

2. A diffusing device as in claim 1 having imprinted thereon a plurality of quantities of light blockers where the first quantity is one and each succeeding quantity is incremented by one; a corresponding exposure factor number is imprinted adjacent each said quantity representing the actual exposure factor of said diffuser when each said quantity of light blockers are placed upon said diffuser.

3. A diffusing device as in claim 1 with a magnetic strip affixed to said diffuser support to hold said light blockers in storage.

* * * * *